United States Patent [19]

Osawa

[11] Patent Number: 5,113,385
[45] Date of Patent: May 12, 1992

[54] OPTICAL DISK CUTTING APPARATUS

[75] Inventor: Seichi Osawa, Saitama, Japan

[73] Assignee: Pioneer Electronic Corporation, Tokyo, Japan

[21] Appl. No.: 547,356

[22] Filed: Jul. 3, 1990

[30] Foreign Application Priority Data

Nov. 10, 1989 [JP] Japan .................................. 1-293721

[51] Int. Cl.$^5$ .............................................. G11B 7/00
[52] U.S. Cl. ............................ 369/44.37; 369/44.38; 369/121; 369/100; 369/111; 250/201.5
[58] Field of Search ............ 369/112, 109, 111, 44.37, 369/44.38, 122, 121, 110, 100, 44.39, 275.3, 275.4, 44.23; 250/201.5

[56] References Cited

U.S. PATENT DOCUMENTS

| | | | |
|---|---|---|---|
| 4,549,287 | 10/1985 | Hatano et al. | 369/44.38 |
| 4,791,625 | 12/1988 | Nakamura | 369/112 |
| 4,896,313 | 1/1990 | Hirose et al. | 369/111 |
| 4,949,331 | 8/1990 | Maeda et al. | 369/44.37 |

Primary Examiner—Roy N. Envall, Jr.
Assistant Examiner—Thang V. Tran
Attorney, Agent, or Firm—Sughrue, Mion, Zinn Macpeak & Seas

[57] ABSTRACT

An optical disk cutting apparatus comprises an exposure optical system for expanding an exposure laser beam and for modulating the exposure laser beam in response to a signal to be recorded, and a focus servo optical system for expanding a focus servo laser beam and for detecting a reflected beam from a master recording disk through a polarizing means, in which one of the exposure and focus-servo optical systems the laser beam of which has a wave length longer than that of the other one includes a focusing lens provided in a stage preceding the objective lens for focusing the expanded laser beam. Therefore, it is possible to make the respective focal positions of the exposure laser beam and the focus servo laser beam be substantially the same and to obtain a small aberration by means of the difference in refractive index between laser beams.

7 Claims, 3 Drawing Sheets

OPTICAL DISK CUTTING APPARATUS

RELATED CASE

This case is related to U.S. application Ser. No. 07/547,357 filed on the same date as this case.

BACKGROUND OF THE INVENTION

The present invention relates to an optical disk cutting apparatus in which a laser beam for focus servo is exclusive used independently of a laser beam for exposure.

RELATED ART

An example of an optical disk cutting apparatus as shown in FIG. 3 has been proposed by applicant. A laser device 1 generates an Ar (argon) laser beam for exposure. The Ar laser beam radiated from the laser device 1 is reflected by reflection mirrors 3, 4 and 5, a dichroic mirror 6 and a reflection mirror 7 so as to be incident to an objective lens 8. The laser beam passed through the objective lens 8 is radiated onto a master recording disk 9. An A-O optical modulator 2 is provided between the laser device 1 and the reflection mirror 3 so that noises contained in the laser beam per se are eliminated and the quantity of exposure is controlled (radial control) at the outside and inside of the master recording disk 9. An A-O optical modulator (or E-O optical modulator) 10 is provided between the reflection mirrors 3 and 4 so as to modulate the laser beam in response to a signal such as a video signal, an audio signal, or the like, to be recorded. A beam expander 11 is provided between the reflection mirrors 4 and 5 so as to expand the diameter of the laser beam to be incident to the objective lens 8 to the full of the edge thereof.

On the other hand, a laser device 13 generates an He-Ne (helium-neon) laser beam for focus servo. The He-Ne laser beam radiated from the laser device 13 is reflected by reflection mirrors 14 and 15 so as to be incident to a beam expander 16. A polarization beam splitter 17 is provided in a stage succeeding the beam expander 16, so that the laser beam expanded by the beam expander 16 passes through the polarization beam splitter 17. The laser beam passed through the polarization beam splitter 17 further passes through the dichroic mirror 6 and then is reflected by the reflection mirror 7 so as to be incident to the objective lens 8. The He-Ne laser beam passed through the objective lens 8 is radiated onto the master recording disk 9. The beam reflected on the master recording disk 9 passes through the objective lens 8, is reflected by the reflection mirror 7, and then passes through the dichroic mirror 6. Then, the reflected beam is reflected by a polarization surface of the polarization beam splitter 17 so as to be supplied to a four-division optical detector 19 through a cylindrical lens 18. The respective output signals of the optical detector 19 are supplied to a focus servo control circuit 20 so that the focus servo control circuit 20 drives an actuator (not shown) of the objective lens 8 correspondingly to the respective output signals of the optical detector 19.

In such an optical disk cutting apparatus, the wave length of the Ar laser beam for exposure is, for example, 458 nm, and the wave length of the He-Ne laser beam is 633 nm, each of the laser beams being made incident to the objective lens 8 as parallel light. In the case of such different wave lengths, in order to make the respective focal positions of the exposure laser beam and the focus servo laser beam be substantially the same and in order to obtain a small aberration, it is necessary to use an achromatic lens as the objective lens 8.

There is however a problem in that if the laser beam for exposure is made to be ultraviolet in order to increase recording density onto a master recording disk, it becomes impossible to make the respective focal positions of the exposure laser beam and the focus servo laser beam be substantially the same and to obtain a small aberration, because the glass material necessary to achromatization absorbs ultraviolet rays. For example, the respective longitudinal spherical aberrations with respect to the laser beams for exposure and focus servo are such that as shown in the characteristics A and B in FIG. 4, so that color aberration is produced between the characteristics A and B.

SUMMARY OF THE INVENTION

It is therefore an object of the present invention to provide an optical disk cutting apparatus in which it is possible to make the respective focal positions of the exposure laser beam and the focus servo laser beam be substantially the same and to obtain a small aberration, even if the laser beam for exposure is made to be ultraviolet.

According to the present invention, the optical disk cutting apparatus comprising an exposure optical system for expanding an exposure laser beam radiated from an exposure laser generating means so as to make the expanded exposure laser beam incident to an objective lens and for modulating the exposure laser beam in response to a signal to be recorded in a stage preceding the objective lens, and a focus servo optical system for expanding a focus servo laser beam radiated from a focus servo laser generating means so as to make the expanded focus servo laser beam incident to the objective lens and for detecting a reflected beam from a master recording disk through a polarizing means, in which one of the exposure and focus-servo optical systems the laser beam of which has a wave length longer than that of the other one includes a focusing means provided in a stage preceding the objective lens for focusing the expanded laser beam.

In the optical disk cutting apparatus according to the present invention, since the focusing means for focusing the expanded laser beam, the beam diameter of the laser beam incident into the objective lens the wave length of which is longer than that of the other laser beam can be made small so that it is possible to make the respective focal positions of the exposure laser beam and the focus servo laser beam be substantially the same and to obtain a small aberration by means of the difference in refractive index between laser beams.

DETAILED DESCRIPTION OF PREFERRED EMBODIMENT

An embodiment of the present invention will be described in detail with reference to the drawings.

Figure 1:
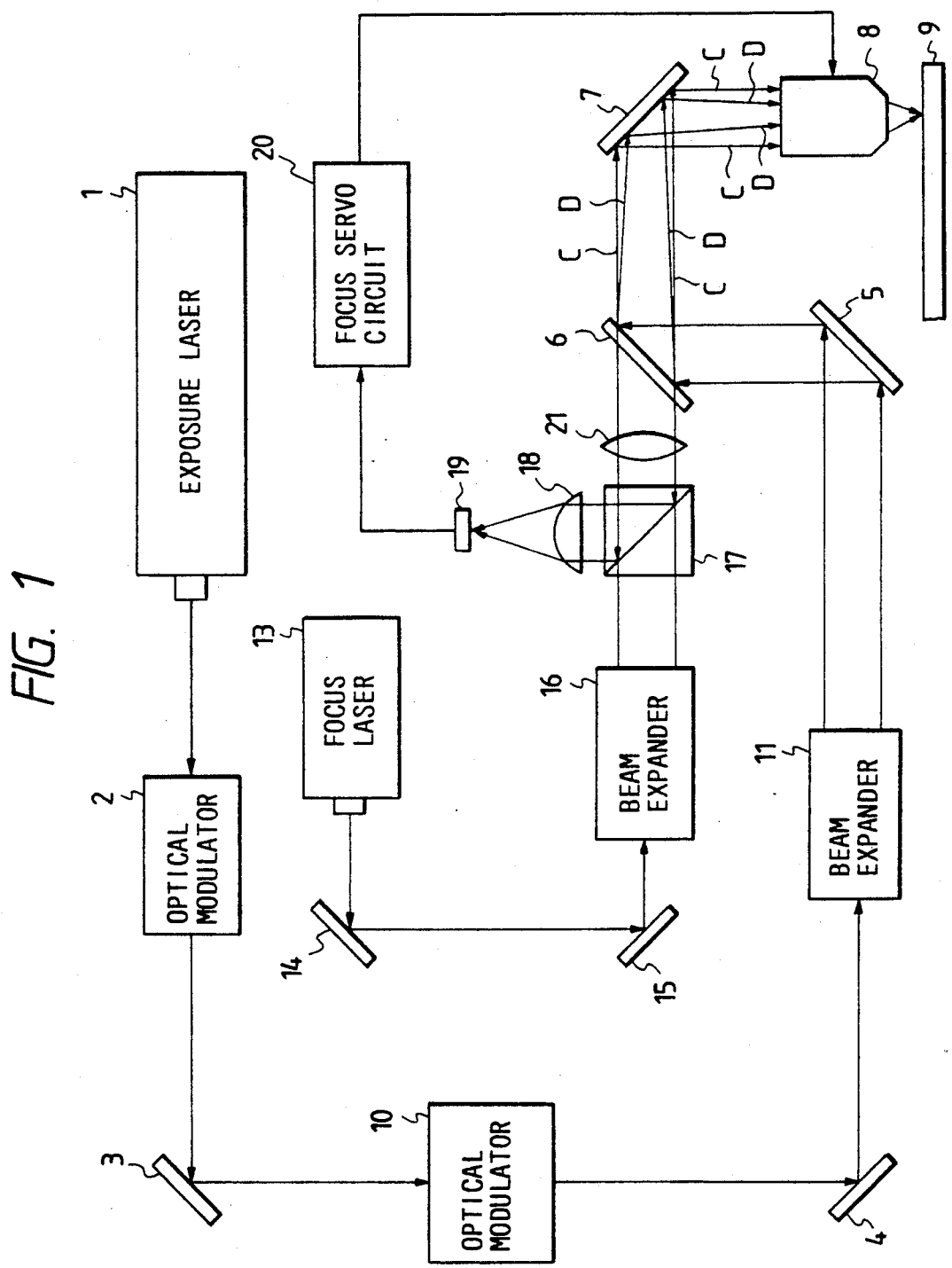
FIG. 1 is a constituent diagram illustrating an embodiment of the present invention.
Figure 3:
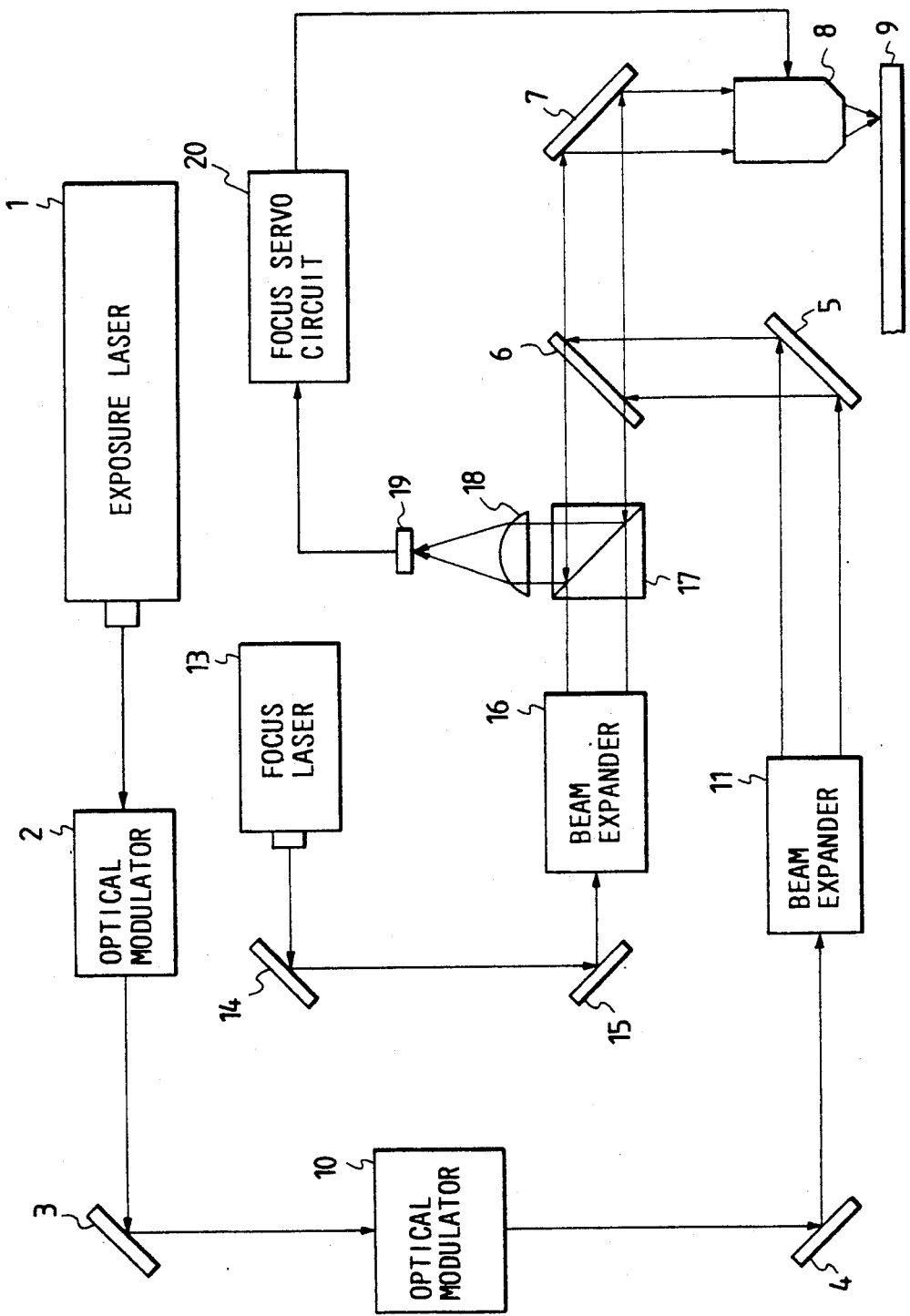
FIG. 3 is a constituent diagram illustrating an optical disk cutting apparatus which has been proposed by applicant.

In an embodiment of the present invention shown in FIG. 1, the same parts as those in an apparatus shown in FIG. 3 are referenced correspondingly. A convex lens 21 as a focusing means is provided between a polarization beam splitter 17 and a dichroic mirror 6. The other configuration is the same as that shown in FIG. 3.

In such a configuration, an Ar laser beam for exposure radiated from a laser device 1 passes through an optical modulator 2 and is wholly reflected by a reflection mirror 3. The reflected laser beam is incident to an optical modulator 10 so as to be modulated correspondingly to a signal to be recorded, and then modulated laser beam is wholly reflected by a reflection mirror 4. The laser beam reflected by the reflection mirror 4 is made to be expanded parallel light by a beam expander 11, and then further reflected by a reflection mirror 5, a dichroic mirror 6 and a reflection mirror 7 as shown by the solid line C in FIG. 1 so as to be supplied to an objective lens 8. The laser beam passed through the objective lens 8 is radiated onto a master recording disk 9 so as to expose photo-resist coating on the surface of the master recording disk 9. This optical system for exposure has the same operation as the apparatus shown in FIG. 3. But the objective lens 8 is not an achromatic lens.

On the other hand, a laser beam for focus servo radiated from a laser device 13 is reflected by reflection mirrors 14 and 15, and then made to be expanded parallel light by a beam expander 16. The expanded laser beam for focus servo passes through a polarization beam splitter 17 so as to be incident to a convex lens 21. The convex lens 21 converts the parallel incident laser beam for focus servo to a focused beam. Therefore, as shown in the solid line D in FIG. 1, the laser beam for focus servo passes through the dichroic mirror 6 while being focused, and then the laser beam is reflected by the reflection mirror 7 so as to be incident to the objective lens 8. The laser beam for focus servo has longer wave length and smaller refractive index than the laser beam for exposure. Accordingly, the beam diameter of the laser beam for focus servo incident to the objective lens 8 is made small so as to make it possible to make the respective focal positions of the beams through the objective lens 8 be substantially the same.

Figure 2:
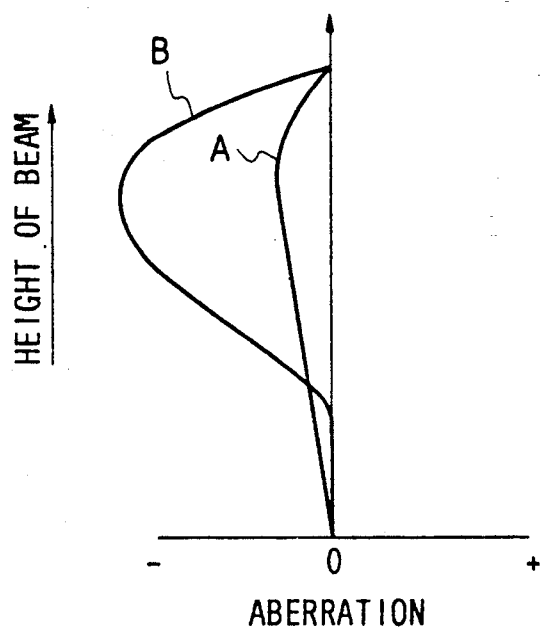
FIG. 2 is a characteristic diagram illustrating color aberration between exposure and focus servo laser beams in the apparatus depicted in FIG. 1.
Figure 4:
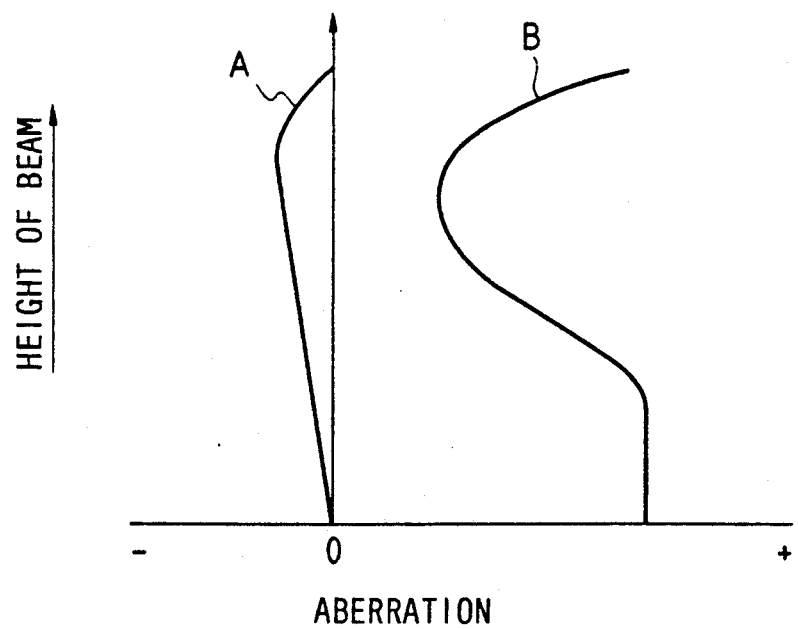
FIG. 4 is a characteristic diagram illustrating color aberration between exposure and focus servo laser beams in the apparatus depicted in FIG. 3.

As shown in FIG. 2, it is therefore possible to reduce color aberration which is a deference between the longitudinal spherical aberration curves (the characteristics A and B) with respect to the laser beams for exposure and focus servo respectively.

Although a convex lens is provided as a focusing means in the optical system for focus servo because the focal length of the objective lens is longer for the laser beam for focus servo than for the laser beam for exposure in the above-mentioned embodiment, it will do to provide a diffusing means (for example, a concave lens) in the inverse case.

As has been described above, in the optical disk cutting apparatus according to the present invention, because of provision of a focusing means in a focus servo optical system to make the spot position of an exposure laser beam close to that of a focus servo laser beam, it is possible to compensate the difference in focal length caused by the difference in wave length between the laser beams, and it is possible to make the beam diameter of a longer wave length laser beam incident to an objective lens small. It is therefore possible to make the respective focal positions of the exposure laser beam and the focus servo laser beam be substantially the same and to make the aberration small by means of the difference in refractive index between laser beams. Further it is not necessary to use an achromatic lens for an objective lens in the case where the exposure laser beam is made to be ultraviolet, so that the design of the objective lens is made easy.

What is claimed is:

1. An optical disk cutting apparats comprising:
   an exposure optical system including means for expanding an exposure laser beam radiated from an exposure laser generating means so as to make the expanded exposure laser beam incident to an objective lens and means for modulating said exposure laser beam in response to a signal to be recorded onto a master recording disk, said laser beam being modulated prior to contacting said objective lens, and
   a focus servo optical system including means for expanding a focus servo laser beam radiated form a focus servo laser generating means so as to make the expanded focus servo laser beam incident to said objective lens and means for detecting said focus servo laser beam reflected from said master recording disk through a polarizing means, wherein the one of said exposure and focus-servo optical systems having a laser beam wave length longer than that of the other system includes a focusing means provided in a stage preceding said objective lens.

2. An optical disk cutting apparatus according to claim 1, said focusing means is a convex lens.

3. An optical disk cutting apparatus comprising:
   exposure optical system including means for generating an exposure laser, reflecting means for leading said exposure laser beam onto a master recording disk, means for modulating said laser beam in response to a signal to be recorded onto said master disk, a beam expander for expanding said modulated laser beam to a parallel light, and an objective lens;
   focus servo optical system including means for generating focus servo laser, reflecting means for leading said focus laser beam onto said master recording disk, a beam expander for expanding said laser beam to a parallel light and a polarizing beam splitter for reflecting light reflected from said master recording disk; and
   focusing means positioned between said objective lens and said focus servo laser generating means for coinciding a focus point of said focus servo laser beam with a focus point of said exposure laser beam on said master recording disk.

4. An optical disk cutting apparatus according to claim 3, wherein said focusing means is provided in one of said exposure and focus-servo optical systems in which the laser beam has a wave length longer than that of the other one.

5. An optical disk cutting apparatus according to claim 4, said focusing means is a convex lens.

6. An optical disk cutting apparatus according to claim 3, wherein said exposure laser is an Ar (argon) laser and said focus servo laser is an He-Ne (helium-neon) laser.

7. An optical disk cutting apparatus according to claim 1, further including a dichroic mirror for combining said expanded exposure laser beam and said expanded focus servo laser beam, such that said focusing means is positioned between said dichroic mirror and the means for expanding the focus servo laser beam.

* * * * *